No. 895,373. PATENTED AUG. 4, 1908.
H. J. KIMMEL.
RULER.
APPLICATION FILED FEB. 25, 1908.
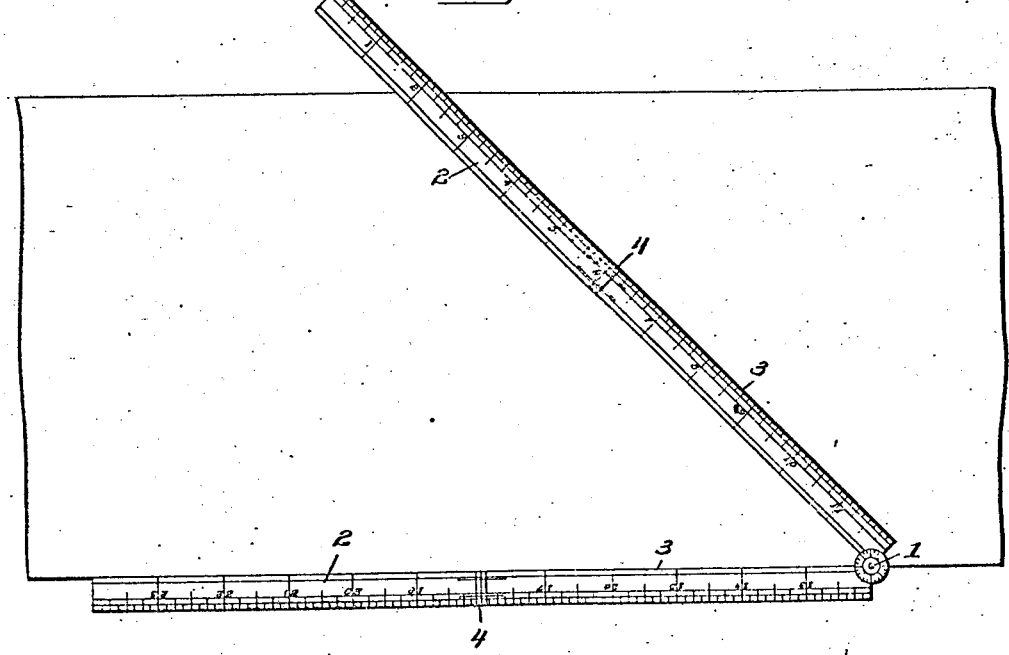
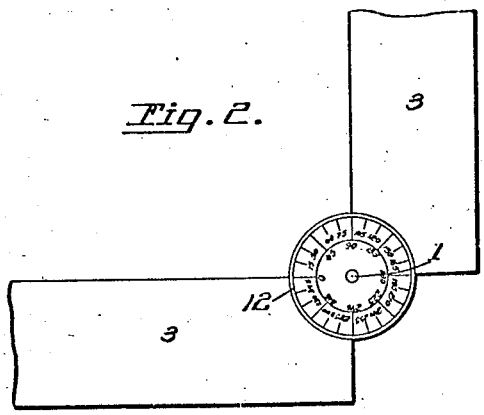
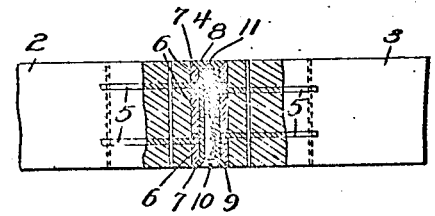
Inventor
Harry J. Kimmel.
Witnesses
F. C. Gibson.
P. M. Smith.
By Victor J. Evans
Attorney

UNITED STATES PATENT OFFICE.

HARRY J. KIMMEL, OF WENATCHEE, WASHINGTON, ASSIGNOR OF ONE-HALF TO SOLOMON W. KIMMEL, OF WENATCHEE, WASHINGTON.

RULER.

No. 895,373.　　　Specification of Letters Patent.　　　Patented Aug. 4, 1908.

Application filed February 26, 1908.　Serial No. 417,940.

*To all whom it may concern:*

Be it known that I, HARRY J. KIMMEL, a citizen of the United States, residing at Wenatchee, in the county of Chelan and State of Washington, have invented new and useful Improvements in Rules, of which the following is a specification.

This invention relates to rules, the principal object of the invention being to provide a novel form of adjustable tension joint for connecting the sections and arms of an ordinary folding rule such as is used by mechanics in every-day work whereby the sections of the rule may be maintained in the proper binding relation to each other to adapt the rule to be used in a strained-out condition and avoid the untimely collapse of the rule.

With the above and other objects in view, the nature of which will more fully appear as the description proceeds, the invention consists in the novel construction, combination and arrangement of parts as herein fully described, illustrated and claimed.

In the accompanying drawings:—Figure 1 is a plan view of a rule embodying the present invention, showing the manner of utilizing the protracting feature thereof for laying off angles. Fig. 2 is an enlarged plan view of the angle protractor. Fig. 3 is an enlarged detail sectional view illustrating the adjustable tension joint between the rule sections. Fig. 4 is an edge view of the same.

The rule, as seen in Fig. 1 is of the ordinary construction comprising the two main arms which are hinged together at the point 1 each arm embodying the sections 2 and 3 which are jointed together at their meeting ends at the joints 4. Each of the joints 1 and 4 is constructed as illustrated in detail in Figs. 3 and 4 wherein it will be observed that the sections 2 and 3, for example, are provided with the usual scales or plates 5 fastened to the respective sections and projecting beyond the adjacent ends of the sections so as to receive the pivot which forms the joint. The usual spacing sleeves 6 are also interposed between the overlapping ends of the scales or plates 5 as shown in Fig. 3, with the exception that under the present invention the outer extremities of the sleeve members 6 are counter-sunk on a bevel as shown at 7 to receive a pair of end to end inner sleeves or tubular clamping elements 8 and 9 one of which has a smooth bore to receive the smooth portion of the shank of a tension screw 10, while the other inner sleeve is internally threaded to be engaged by the threaded portion of the screw 10 as clearly shown in Fig. 3. Thus, by tightening the screw 10, the oppositely arranged inner sleeves 7 and 8 may be drawn together so as to cause the outer flaring ends or beveled shoulders thereof to co-act with the outer spacing sleeves and produce the effect of binding or clamping the joint more-or-less, according to the desire of the owner of the rule. This has the desired effect of preventing the untimely collapse of the rule by the too easy bending or flexing of the joints thereof. It is also preferred to provide the outer end of the sleeve 8 with a screw-driver nick 11 so that looseness in the joint may be taken up from either end.

In addition to the joint above described which also occurs at the point 1 where the arms of the rule connect, I employ a graduated angle protractor disk 12 which is fixed relatively to one of the rule arms and movable relatively to the other arm, the disk being provided with graduations to represent degrees of angles and adapted to register with the inner edge of the rule arm which is movable relatively to the protracting disk. This enables the workmen to lay off any desired angle without figuring the same out in the usual manner.

Having thus described the invention, what is claimed as new, is:—

1. A rule joint comprising overlapping plates, spacing sleeves engaging said plates, tubular clamping elements extending into said sleeves and provided with beveled shoulders which coöperate with corresponding shoulders of the opposing sleeves, and means for drawing said clamping elements toward each other.

2. An adjustable tension joint for rules embodying overlapping scales or plates, spacing sleeve sections having a bearing against said scales, inner sleeves arranged end to end within the spacing sleeve sections, one of which inner sleeves is internally threaded, and a tension screw inserted through the other sleeve and into threaded engagement with the internally threaded sleeve, substantially as described.

In testimony whereof I affix my signature in presence of two witnesses.

HARRY J. KIMMEL.

Witnesses:
GEORGE W. PAYTON,
W. R. WILSON.